United States Patent [19]
Hauffe et al.

[11] 3,921,449
[45] Nov. 25, 1975

[54] METER BOX FOR FLUID METER EQUIPMENT

[75] Inventors: William L. Hauffe, Warrensburg; Narayan C. Saha, Decatur, both of Ill.

[73] Assignee: Mueller Co., Decatur, Ill.

[22] Filed: Apr. 10, 1974

[21] Appl. No.: 459,791

[52] U.S. Cl. .................. 73/273; 49/35; 137/371
[51] Int. Cl.² ........................................ G01F 15/14
[58] Field of Search ...... 73/201, 273, 431; 324/156; 49/169, 171, 465, 35; 292/175; 137/371

[56] References Cited
UNITED STATES PATENTS

| | | | |
|---|---|---|---|
| 1,204,464 | 11/1916 | Lofton | 73/201 X |
| 1,693,190 | 11/1928 | Benedetti | 49/465 |
| 1,988,360 | 1/1935 | Moore | 49/465 |
| 3,212,339 | 10/1965 | Olmedo | 73/431 |
| 3,230,844 | 1/1966 | Isaacs | 49/169 X |
| 3,443,436 | 5/1969 | Meyer | 73/273 |

Primary Examiner—Richard C. Queisser
Assistant Examiner—John P. Beauchamp
Attorney, Agent, or Firm—Cushman, Darby & Cushman

[57] ABSTRACT

A meter box for fluid meter equipment is disclosed which is made of structural foam polyethylene. The meter includes a side wall enclosure with a base plate secured to the bottom thereof. The top of the enclosure is open and has an inwardly directed flange across the top thereof. A meter lid is positioned on and supported by the flange portion of the side enclosure. The meter lid includes a central opening into which is rotatably positioned a reader lid. The reader lid includes a latch member on the underside thereof which is normally biased into a locking position to secure the reader lid in a closed position. When the reader lid is to be opened, a key is inserted through an aperture in the lid and between the sides of a U-shaped rod to which the latch is connected. The key is rotated against the edge of the aperture to force the latch inwardly against the bias of a spring to thereby unlock the reader lid. The latch includes a cammed surface which bears against the edge of the periphery of the aperture in the meter lid when the reader lid is closed. The latch is forced inwardly to permit closure of the lid. The latching arrangement for the meter lid is of the same construction as that of the reader lid.

10 Claims, 5 Drawing Figures

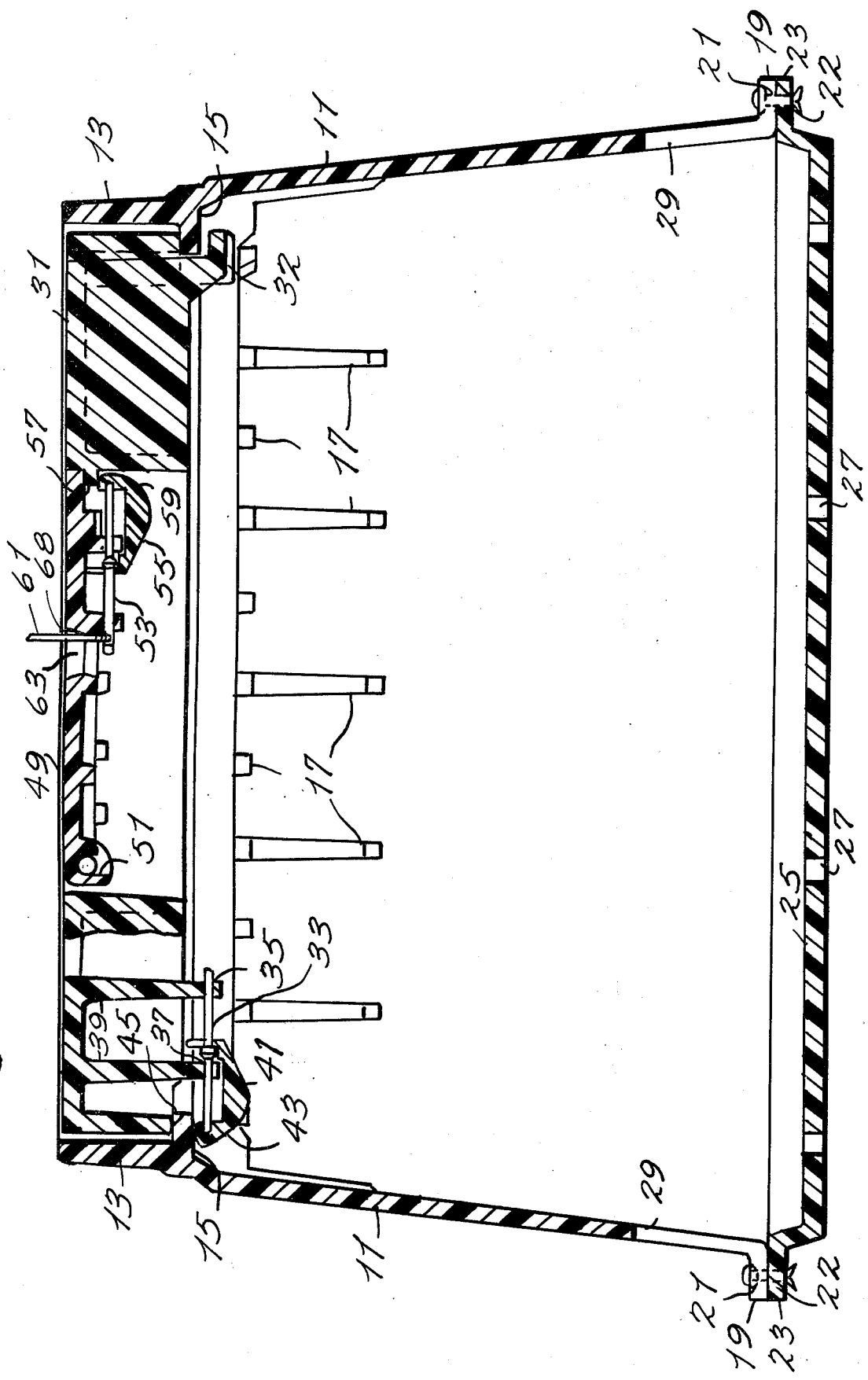

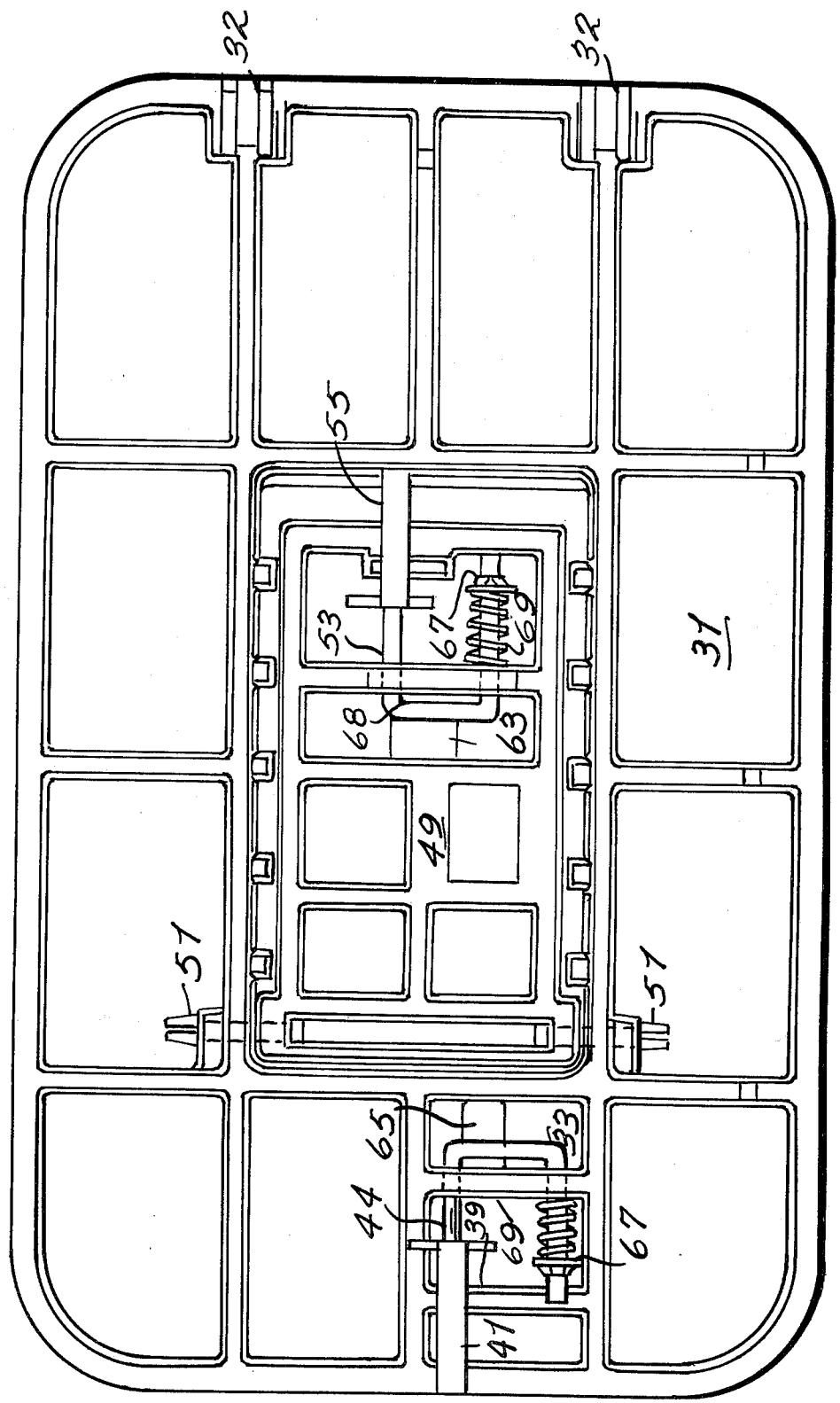

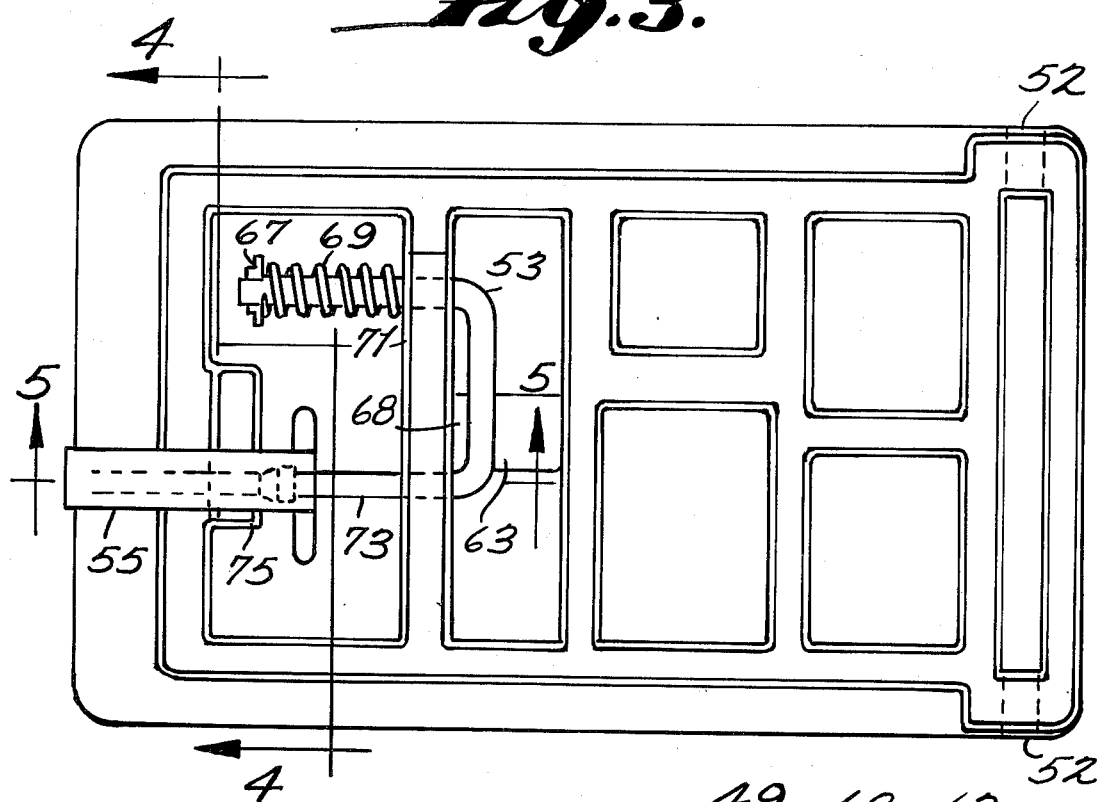
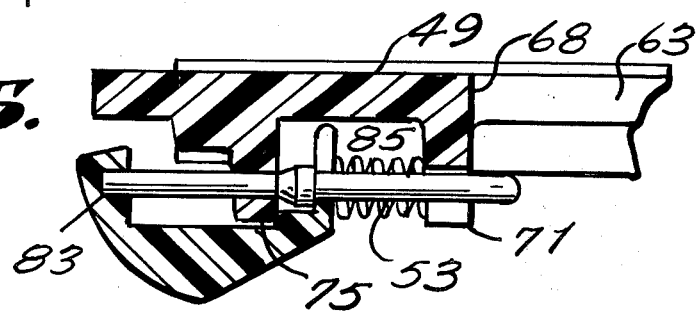
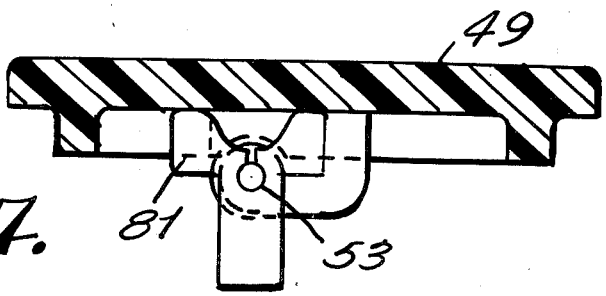

METER BOX FOR FLUID METER EQUIPMENT

BACKGROUND OF THE INVENTION

This invention relates to a meter box for fluid meter equipment.

In the past, meter boxes have been formed of a heavy iron construction and have typically included meter lids which are either of a complex construction or not capable of permitting viewing access to a meter inside the box without disassembling the entire cover plate of the meter box. Thus, U.S. Pat. No. 654,615 discloses a meter box having a unitary coverplate with a pair of locking levers positioned underneath its surface. When the locking levers are appropriately disengaged from the walls of the meter box by turning a nut, the cover plate can be lifted to expose a meter positioned inside the meter box. In a somewhat similar arrangement, U.S. Pat. No. 950,270 disclosed a meter box having a wooden plug for closing a hole through which the face plate of the meter positioned within the meter box can be viewed. The hole leading to the interior of the meter box is quite small, and accordingly the meter within the box cannot be repaired or replaced without removing the entire meter box.

More recently, meter boxes have been developed with lids which include a cover member having a reader lid associated therewith, wherein when the meter housed within the meter box is to be read, the reader lid is opened and when the meter is to be repaired or replaced, the entire meter box cover is removed. Such an arrangement is disclosed in U.S. Pat. No. 217,097 wherein the cover plate is secured to the side walls of the meter box by means of a number of bolted down locking bars. Access to these bars can be made by opening a reader lid and extending a tool inside of the meter box to the underside of the cover plate where the locking rods are positioned. Such an arrangement is quite cumbersome and difficult to work with, when physical access to the meter is required. Lofton U.S. Pat. No. 2,018,615 discloses another arrangement wherein a meter box cover plate includes a plurality of cover plates which can be rotated open to permit viewing of the meter positioned therein and to permit access to the valves in the meter box. However, none of these references teaches a simplified arrangement for permitting viewing access to the meter face by opening a reader lid in the meter cover plate and for permitting physical access to the meter itself by opening the cover plate.

It therefore is an object of this invention to provide a meter box of a simplified construction.

It is another object of this invention to provide a meter box which provides a means for easily viewing the meter face and for separately physically accessing the meter.

It is yet another object of this invention to provide a meter box of simplified construction made of structural foam plastic.

SHORT STATEMENT OF THE INVENTION

This invention relates to a structural foam plastic meter box having a side wall enclosure with an opening at the top thereof with a cover plate supporting flange extending inwardly near the top. A base plate having a plurality of holes therethrough for permitting the egress of water or other fluids is secured to the bottom of the side wall enclosure by means of plastic rivets, wherein the side wall enclosure and the base plate form a non-corrosive chamber into which a fluid meter can be positioned. A cover plate is removably positioned on the flange portion of the side wall enclosure wherein the cover plate has a hole therethrough for receiving a reader lid which is rotatably secured to the meter box cover plate. The reader lid is maintained in a locked position by means of a U-shaped locking rod having a latching member formed integral therewith. The locking rod is mounted on the underside of the reader lid and is normally biased so that the latch engages with a portion of the underside of the meter cover to thereby lock the reader lid in a closed position. The rod and latch are moved out of engagement with the cover plate when an appropriate key or tool is inserted through a hole in the reader lid into engagement with the base of the U-shaped locking rod to pull the locking rod and latch out of engagement with the cover plate. The reader lid can be closed without requiring a tool because the undersurface of the latch member is cammed so that when the reader lid is forced downward, the cammed surface bears against the cover plate to thereby force the latch and rod inwardly away from the edge of the aperture of the coverplate.

The locking mechanism associated with the cover plate is of the same design and is operated by extending a key or tool through an aperture in the cover plate so that the tool engages the base of a U-shaped locking rod. The cover plate, however, is not rotated open but rather is removed by lifting the cover plate up and away from the top of the side wall enclosure.

BRIEF DESCRIPTION OF THE DRAWINGS

Other objects, features and advantages of the present invention will become more fully apparent from the following detailed description of the preferred embodiment, appended claims and accompanying drawings, in which:

FIG. 1 is a side section view taken in elevation of the meter box of the present invention;

FIG. 2 is a bottom view of the plastic meter lid with reader lid of the present invention;

FIG. 3 is a bottom view of the reader lid of the present invention showing the locking mechanism;

FIG. 4 is a section view of the locking mechanism for the reader lid taken in section along the line 4—4 of FIG. 3; and FIG. 5 is a partial section view of the latch mechanism of the present invention.

DETAILED DESCRIPTION OF THE PREFERRED EMBODIMENT

Refer now to FIG. 1, where there is illustrated the meter box of the present invention. The meter box includes a side wall enclosure 11 which in the preferred embodiment is formed of a molded structural foam polyethylene material such as described in U.S. Pat. Nos. 3,268,636 and 3,436,446 which patents are assigned to the Union Carbide Corporation. It should be understood, however, that any suitable thermoplastic material could be utilized in keeping with the invention. As illustrated the side wall enclosure slopes inwardly toward the top and terminates in a collar portion 13 having an inwardly directed flange portion 15. Support against external ground pressure is provided by a plurality of integral ribs 17 which are formed at spaced intervals on the side wall 11 by means of a suitable molding process known in the art. At the base of the side wall enclosure 11 is formed a ledge 19 having a plurality of holes 21 therethrough. Mating with the ledge 19 is the connecting surface 23 of a base plate 25. Base plate 25 is also constructed of a suitable thermoplastic material such as structural foam polyethylene and has a plurality of holes 27 therethrough for permitting the egress of water from the inside of the meter to the outside thereof. The base plate 25 also has a plurality of holes 22 which mate with the holes 21 of the side wall enclosure 11. Plastic rivets extend through the holes 21 and 22 to secure the base plate to the ledge 19 of the side wall enclosure 11. It should be understood however that other means, such as clips, nuts and bolts, etc., could be used in lieu of the plastic rivets.

A pair of access holes 29 extend through the side wall enclosure 11 at diametrically opposite sides thereof. These holes receive the input and output pipes which convey fluid with respect to the meter (not shown) positioned in the meter housing. Typically, the meter is supported within the meter box by means of a yoke assembly which spaces the meter with respect to the base plate 25 so that water or other fluids on the inside of the base plate 25 do not corrode or otherwise damage the meter positioned therein.

A cover plate 31 is positioned in the opening defined by the collar 13 and rests on the flange 15 which extends inwardly about the inside periphery of the top of the side wall enclosure 11. The cover plate includes at least one dog 32 which extends around and underneath the flange 15 to prevent the meter cover from being raised up and away from the meter box by unauthorized personnel.

At the opposite end of the cover plate from the dog 32 is a locking assembly. A U-shaped locking rod 33 is slidably connected to the underside of the cover plate 31 by inserting the locking rod through holes 35 and 37 in a pair of support arms 39 which extend downwardly from the top of the cover plate. The support arms 39 are formed integral with the cover plate 31 by means of molding techniques known in the art. The locking rod 33 is biased to the left so that a molded latch member 41 fixedly connected thereto extends under the flange portion 15 of the side wall enclosures. The molded latch 41 has a cammed surface 43 so that when the cover plate 31 is moved downwardly into position, the surface 43 is pushed against the edge 45 of the flange 15. This causes the latch 41 and locking rod 33 to be moved inwardly to the right against the biasing force, thereby permitting closure of the cover plate without requiring any external tools. When the latch 41 has cleared the flange 15, it springs back into the position shown in the figure.

A reader lid 49 is shown positioned on the cover plate 31 and in substantial alignment with the top surface thereof. The reader lid 49 is pivotably connected to the cover plate 31 by means of plastic hinge pins 51, however, other pins, such as a pair of zinc plated cotter pins or a brass hinge pin may be utilized. At the opposite end of the reader lid is a locking arrangement which includes a locking rod 53 having a latch member 55 secured thereto. While in the preferred embodiment the latch 55 and rod 53 are identical to the latch 41 and rod 33, it should be understood that the respective latches and rod may be of different size and shape. The locking rod 53 and the latch 55 are biased to the right so that the latch 55 engages the underside of a flange portion 57 of the cover plate 31. The end of the reader lid rests upon this flange so that the reader lid does not pivot into the inside of the meter housing. As illustrated, latch 55 has a cammed surface 59 for permitting the closure of the lid 49 without requiring extra tools for withdrawing the latch 55 from its normally closed position.

With the reader lid in the position shown, a tool 61, such as a screwdriver, chisel or an appropriate key, is inserted through an aperture 63 in the reader lid and into the base portion of the U-shaped rod 53 between the legs thereof. The tool is then rotated clockwise to force the locking rod 53 and hence the latch 55 to the left against the bias force exerted thereon. When the latch 55 clears the end of the flange 57, the reader lid can be rotated counterclockwise to provide a viewing access to the meter within the meter box.

Refer now to FIG. 2, which is a bottom view of the plastic meter lid with reader lid of the present invention. The cover plate 31 is illustrated having a pair of dogs 32 which secure one end of the plate to the side wall enclosure 11 of the meter box. At the opposite end of the cover plate is an aperture 65 through which an appropriate tool is inserted to make contact with the base portion of the U-shaped locking rod 33. One one leg of the locking rod is mounted a push nut 67 which provides a stop for a stainless steel biasing spring 69. The other end of the biasing spring 69 bears against support arm 39 to thereby force the locking rod 33 to the left. When the locking rod is forced to the right by means of an appropriate tool, the latch 41, either fixedly secured to leg 44 or formed integral therewith, is disengaged from the underside of the flange 15 to thereby permit the cover plate to be rotated and then lifted away from the meter box.

The reader lid 49 is rotatably secured to the cover plate 31 by means of a pair of pivot pins 51. Hinge pins 51 are preferably of plastic construction but can be of any other suitable material such as zinc or brass, if desired, and may be of any suitable form known in the art. The reader lid 49 also includes an aperture 63 through which an appropriate tool can be passed to engage the base portion of a second hook-shaped locking rod 53, illustrated in FIG. 1. Thus, referring back to FIG. 1, by moving the tool to the left or by rotating the tool clockwise about the front edge 68 of the aperture 63, the locking rod 53 and its associated latch 55 are moved to the left to thereby disengage the latch from the flange portion 57 of the cover plate 31.

Refer now to FIG. 3 which is a more detailed bottom view of the reader lid 49 illustrated in FIGS. 1 and 2. One end of the reader lid includes a downwardly depending hinge portion having holes 52 extending therethrough for receiving the pivot pins 51. At the other end of the reader lid is positioned a U-shaped locking rod 53 which is slidably secured to the underside of the reader lid by inserting both leg portions of the rod through a first support member 71 and the second leg portion 73 through a second support arm 75. The locking rod which may be formed of a thermoplastic material has a push nut 67 secured to the end of one leg against which a stainless steel compression spring 69 is positioned. The compression spring 69 forces the locking rod 53 to the left so that a latch member 55 secured thereto engages with the underside of the flange 57 of the cover plate. When the locking rod 53 is to be moved to the right in order to free the latch 55, an appropriate tool, such as a screwdriver, is inserted through the hole 63 and into the base of the U-shaped rod between the respective legs thereof. The two are then either moved to the right in unison or the tool is rotated about the edge 68 of the reader lid so that the locking rod is forced to the right.

Refer now to FIGS. 4 and 5 which are partial section views of the locking assembly of the reader lid. As best illustrated in FIG. 4, the locking assembly includes a bifurcated contact portion 81 which abuts the underside of the reader lid 49. This provides for a substantial contact area and prevents the latch from rotating out of position. The locking rod 53 is inserted into a bore 83 at one end of the latch 55 and is passed through a hole 85 at the other end of the latch. The locking rod is enlarged where it passes through the hole 85 to provide an interference between the latch and the rod, as illustrated. Thus, when the rod is moved to the right, the latch 55 is forced to move therewith. It should be understood, however, that the rod and latch can be secured to one another by other means, such as for example, a cotter pin arrangement.

The meter box including the meter lid of this invention is of a substantially all-plastic structure in order to prevent corrosion and other damaging effects due to moisture and chemicals in the ground surrounding the meter box. In addition, the lid is formed having a reader lid portion so that the meter face of the meter positioned within the housing can be read without opening the entire cover plate. However, when physical access is required to the meter or the valves associated therewith, the entire meter lid can be raised up and away from the meter housing by operating the simplified locking arrangement, which, while easy to operate by those understanding the operation of the lock, is substantially tamper-proof by those not versed in the operation thereof.

This invention has been disclosed in connection with a preferred embodiment. However, it should be understood that various modifications are contemplated and may obviously be resorted to by those of ordinary skill in the art without departing from the spirit and scope of the invention as hereinafter defined by the appended claims.

What is claimed is:

1. A meter box comprising
a side wall enclosure having an opening at the top thereof,
a meter box lid removably positioned on said side wall enclosure at the top thereof, said meter box lid having an aperture therethrough,
a reader lid rotatably secured to said meter box lid and positioned in said aperture of said meter box lid.
a first U-shaped locking rod slidably mounted with respect to the underside of said reader lid,
a latching member secured to said locking rod on one leg thereof for reciprocating movement therewith, said latching member having a lower cammed surface and an upper relatively wide contact surface cooperating with the underside of said lid for preventing the latch from turning with respect to said rod and said lid,
a spring biasing means positioned about the other leg of said U-shaped rod for normally biasing said locking rod and said latch into engagement with the underside of said meter lid to thereby lock said reader lid in a closed position and for biasing said locking rod and latch toward the underside of said meter lid when said latch and said rod are moved against said bias to free said latch from the underside of said meter lid,
a second U-shaped locking rod slidably mounted with respect to the underside of said meter box lid,
a second latching member secured to said second locking rod on a leg thereof, for reciprocating movement therewith, said second latching member having a lower cammed surface and an upper relatively wide surface cooperating with the underside of said lid for preventing the second latch from turning with respect to said rod and said meter lid,
a spring biasing means positioned about the other leg of said second U-shaped rod for normally biasing said second locking rod and said second latch into engagement with said side wall enclosure to thereby lock said meter box lid in a closed position and for biasing said second locking rod and said second latch toward said side wall enclosure when said second latch and said second rod are moved against said bias to free said second latch from said side wall enclosure.

2. A meter box comprising
a side wall enclosure having an opening at the top thereof, said side wall enclosure forming a chamber into which a fluid meter is positioned,
a meter box cover plate removably positioned on said side wall enclosure,
a U-shaped locking rod slidably mounted with respect to the underside of said cover plate,
a latching member secured to said locking rod on one leg thereof for reciprocating movement therewith, said latching member having a lower cammed surface and an upper relatively wide contact surface cooperating with the underside of said cover plate for preventing the latch from turning with respect to said rod and said cover plate, and
a spring biasing means positioned about the other leg of said U-shaped rod for normally biasing said locking rod and said latching member into engagement with said side wall enclosure to thereby lock said cover plate in a closed position.

3. The meter box of claim 1 wherein said latch members each includes means for directing said latch and rod inwardly against said bias when said meter box lid or said reader lid is being closed.

4. The meter box of claim 3 wherein said means for directing said latch and rod inwardly includes a cam surface on said latch wherein when the lid to which said latch is slidably attached is closed said cam surface is forced inwardly against said bias force, and wherein said latch has a bore therein for receiving the end of the leg of said rod to which said latch is secured and wherein said leg of said rod has a dimension interference with respect to said latch to prevent relative movement of said rod with respect to said latch.

5. The meter box of claim 1 wherein said side wall enclosure and said base plate are made of structural foam polyethylene.

6. The meter box of claim 1 wherein said side wall enclosure is tapered inwardly from bottom to top and wherein a plurality of ribs are formed integral with said side wall enclosure to thereby strengthen said enclosure against inwardly directed external forces.

7. The meter box of claim 1 wherein said latch member includes means for directing said latch and rod away from said side wall enclosure against said bias when said cover plate is being closed.

8. The meter box of claim 7 wherein said means for directing said latch and rod inwardly includes a cam surface on said latch wherein when the cover plate to which said latch is slidably attached is closed, said cam surface bears against said side wall enclosure thereby forcing said latch inwardly away from said side wall enclosure against said bias force.

9. The meter box of claim 2 further comprising a base plate fixedly secured to the bottom of said side wall enclosure, said side wall enclosure and said base plate forming a chamber into which a fluid meter can be positioned.

10. The meter box of claim 1 wherein said meter box cover plate has a hole therethrough, and further comprising a reader lid rotatably secured to said cover plate and normally positioned to close said hole in said cover plate and means for releasably securing said reader lid in said cover plate hole closing position.

* * * * *